United States Patent
Kim et al.

(10) Patent No.: US 7,327,810 B2
(45) Date of Patent: Feb. 5, 2008

(54) EFFICIENT CONJUGATE GRADIENT BASED CHANNEL ESTIMATOR

(75) Inventors: Jin H. Kim, Lake Zurich, IL (US); Serdar Ozen, Vernon Hills, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 856 days.

(21) Appl. No.: 10/729,722

(22) Filed: Dec. 5, 2003

(65) Prior Publication Data

US 2005/0123074 A1    Jun. 9, 2005

(51) Int. Cl.
*H03D 1/00*    (2006.01)
(52) U.S. Cl. ..................................... 375/340
(58) Field of Classification Search ............... 375/340, 375/229, 233, 234; 708/322, 323
See application file for complete search history.

(56) References Cited

U.S. PATENT DOCUMENTS

| 6,647,078 | B1 | 11/2003 | Thomas et al. | |
| 6,977,977 | B1* | 12/2005 | Dubrovin et al. | 375/346 |
| 6,980,602 | B1* | 12/2005 | Kleinerman et al. | 375/262 |
| 7,113,540 | B2* | 9/2006 | Yousef et al. | 375/233 |
| 2002/0159543 | A1* | 10/2002 | Perlow et al. | 375/324 |
| 2002/0159544 | A1* | 10/2002 | Karaoguz | 375/329 |
| 2003/0086564 | A1* | 5/2003 | Kuhlman | 380/37 |
| 2005/0019042 | A1* | 1/2005 | Kaneda et al. | 398/208 |
| 2005/0053129 | A1* | 3/2005 | Yousef | 375/233 |

FOREIGN PATENT DOCUMENTS

WO    WO 03/036891 A2    5/2003

OTHER PUBLICATIONS

T. Sarkar et al., "Accurate and Efficient Solution of Hankel Matrix Systems by FFT and the Conjugate Gradient Methods", Intl. Conference on Acoustics, Speech & Signal Processing, Apr. 6-9, 1987, 4 pgs. (XP-000758077).

R. Soni et al., "Channel Equalization with Adaptive Filtering and the Pre-conditioned Conjugate Gradient Algorithm", 1997 IEEE Intl. Symposium on Circuits and Systems, Jun. 9-12, 1997, Hong Kong, pp. 2284-2287.

M.D. Zoltowski et al., "Conjugate Gradient Based Multichannel Decision Feedback Equalization for Digital Television", 2002 IEEE Sensor Array and Multichannel Signal Processing Workshop Proceedings, Aug. 4, 2002, pp. 599-603.

* cited by examiner

*Primary Examiner*—Emmanuel Bayard

(57) ABSTRACT

In forming a channel estimate, a received signal y is decoded to form data s, a convolution matrix $\hat{S}$ is formed from the data s, a matrix F is formed from the data s such that the matrix F results from the forming of the matrix $\hat{S}$ as a convolution matrix, and a conjugate gradient algorithm is performed to determine the channel estimate. The conjugate gradient algorithm is based on the received signal y, the matrix $\hat{S}$, and the matrix F.

24 Claims, 2 Drawing Sheets

EFFICIENT CONJUGATE GRADIENT BASED CHANNEL ESTIMATOR

TECHNICAL FIELD OF THE INVENTION

The present invention relates to a conjugate gradient based channel estimator.

BACKGROUND OF THE INVENTION

Since the adoption of the ATSC digital television (DTV) standard in 1996 in the United States, there has been an ongoing effort to improve the design of receivers built for the ATSC DTV signal. The primary obstacle that faces designers in designing receivers so that they achieve good reception is the presence of multipath interference in the channel.

The broadcast television channel is a relatively severe multipath environment due to a variety of conditions that are encountered in the channel and at the receiver. Channels are characterized by impulse responses which may be several hundreds of symbols long, so that strong interfering signals may arrive at the receiver both before and after the largest amplitude signal. In addition, the signal transmitted through the channel is subject to time varying channel conditions due to the movement of the transmitter and signal reflectors, airplane flutter, and, for indoor reception, people walking around the room. If mobile reception is desired, movement of the receiver must also be considered.

Moreover, the ATSC DTV signal uses trellis coded 8-level vestigial sideband (usually referred to as 8T-VSB or, more simply, as 8-VSB) as the modulation method. 8-VSB data symbols are real and have a signal pulse shape that is complex. Only the real part of the complex pulse shape is a Nyquist pulse. Therefore, even if there is no multipath, the imaginary part of the complex pulse shape contributes intersymbol interference (ISI) when the channel gain seen by the equalizer is not real.

Multipath and intersymbol interference adversely affect the ability of the receiver to correctly receive the symbols transmitted by the transmitter. Therefore, designers add equalizers to receivers in order to cancel the effects of multipath and intersymbol interference and thereby improve signal reception.

Because the channel is not known a priori at the receiver, the equalizer must be able to modify its response to match the channel conditions that it encounters and to adapt to changes in those channel conditions. To aid in the convergence of an adaptive equalizer to channel conditions, the field sync segment of the frame as defined in the ATSC standard may be used as a training sequence for the equalizer. But when equalization is done in the time domain, long equalizers (those having many taps) are required due to the long channel impulse responses that characterize the channel.

The original Grand Alliance receiver used an adaptive decision feedback equalizer (DFE) with 256 taps. This adaptive decision feedback equalizer was adapted to the channel using a standard least mean square (LMS) algorithm, and was trained with the field sync segment of the transmitted frame. The LMS algorithm converges quite slowly and, even with only 256 taps, does not always converge during a single training sequence. Because the field sync segment is transmitted relatively infrequently (about every 260,000 symbols), the total convergence time of this equalizer is quite long if the equalizer only adapts on training symbols prior to convergence.

Therefore, in order to adapt equalizers to follow channel variations that occur between training sequences, the addition of blind and decision directed methods to equalizers has been suggested. However, when implemented in a realistic system, these methods may require several data fields to achieve convergence, and convergence may not be achieved at all under difficult multipath conditions.

In any event, because multipath signals in the broadcast channel may arrive many symbols after the main signal, the decision feedback equalizer is invariably used in 8-VSB applications.

It has been argued that a blind decision feedback equalizer is required due to the rise in mean square error (MSE) between training sequences. However, adaptation of the trained equalizer in the simulation that supported this argument was frozen between training sequences. It is possible that a decision-directed equalizer with good tracking performance may be able to follow the channel variations tested.

Blind algorithms based on the Sato algorithm and on Godard's constant modulus algorithm (CMA) have been proposed. The error term in both of these algorithms uses a continuous blending of a decision-directed term with the blind term. This blending enables a smooth transition between the blind mode and the decision-directed mode. However, when implemented in a realistic system, these algorithms also may take several data fields to converge.

As mentioned previously, adaptive equalizers utilizing the least mean square (LMS) algorithm may converge slowly or not at all depending on the channel conditions. Convergence may be adversely affected if the input data auto-correlation matrix has a large eigenvalue spread. Also, if the decision feedback equalizer has not converged before the end of the training sequence, the shape of the objective function may change so that it includes local minima. These local minima may be caused by closed eye channel conditions and decision feedback equalizer error propagation.

The recursive least square (RLS) algorithm is well known to avoid these convergence problems. However, the recursive least square algorithm, in its basic form, requires the computationally intensive inversion of the input data auto-correlation matrix. Lattice based forms of the recursive least square algorithm avoid the need for this matrix inversion. However, the lattice based forms of the recursive least square algorithm are not easily amenable to the advantage of initialization from an initial channel impulse response (CIR) estimate, even though such an initialization may be desirable.

Recent work in reduced rank filtering has connected the multi-stage nested Wiener filter (MSNWF) of Goldstein and Reed to the conjugate gradient algorithm (CG). It has been shown that the multi-stage nested Wiener filter solves the Wiener-Hopf equations in the Krylov subspace associated with the auto-correlation matrix and the cross-correlation vector. The multi-stage nested Wiener filter is then re-formulated using the Lanczos iteration. It has also been shown that the Lanczos-based multi-stage nested Wiener filter is equivalent to the conjugate gradient algorithm. Since the multi-stage nested Wiener filter often needs few dimensions to approach the performance of the full-rank Wiener filter, the conjugate gradient algorithm is a good candidate for an adaptive equalization algorithm with fast convergence.

A description of the conjugate gradient optimization algorithm and many of its mathematical properties may be found in "An Introduction to Optimization," by E. K. P. Chong and S. Zak, New York, N.Y., John Wiley & Sons, 1996. The algorithm described is applicable to the optimization of a fixed objective function. An excellent review of adaptive filtering with the conjugate gradient algorithm is found in "Analysis of conjugate gradient algorithms for adaptive filtering," by P. S. Chang and A. N. Willson, Jr., vol. 48, pp. 409-418, IEEE Transactions on Signal Processing, February 2000. The mathematical richness of the algorithm relationships leads to a variety of options in the implementation of the basic conjugate gradient algorithm for minimizing a quadratic objective function. These options can be carried over to the adaptive situation to provide a number of options for implementation of the algorithm. One characteristic of the algorithm which may also be exploited is that it works directly with the correlation matrices and vectors. This characteristic makes initialization based on an initial channel impulse response straightforward, assuming information is available for this purpose.

Like lattice based forms of the recursive least square algorithm, the conjugate gradient algorithm does not require the inversion of the input data auto-correlation matrix. Another characteristic of the conjugate gradient algorithm may be exploited by recognizing that the input data auto-correlation matrix is the product of two Toeplitz matrices.

It has been known internally by assignee to use these characteristics to substantially reduce the computation load in the conjugate gradient algorithm and to even eliminate the need to form the input autocorrelation matrix. Accordingly, the improved conjugate gradient algorithm disclosed in that application may be used to achieve satisfactory convergence times for equalizers.

It has also been known internally by assignee that the conjugate gradient algorithm can be used to estimate channels. The present invention reduces the computation complexity in performing the conjugate gradient algorithm with respect to channel estimators.

SUMMARY OF THE INVENTION

In accordance with one aspect of the present invention, a method of processing a received signal y to produce a channel estimate comprises the following: (a) decoding the received signal y to form data s; (b) forming a convolution matrix $\hat{S}$ from the data s; (c) forming a matrix F from the data s, wherein the matrix F results from forming the matrix $\hat{S}$ as a convolution matrix; and, (d) performing a conjugate gradient algorithm to determine the channel estimate, wherein the conjugate gradient algorithm is based on the received signal y, the matrix $\hat{S}$, and the matrix F.

In accordance with another aspect of the present invention, a method of processing a received signal y comprises the following: (a) decoding the received signal y to form data s; (b) forming a convolution matrix $\hat{S}$ from the data s; (c) forming a matrix F from the data s, wherein the matrix F results from forming the matrix $\hat{S}$ as a convolution matrix; and, (d) performing a conjugate gradient algorithm based on the received signal y, the matrix $\hat{S}$, and the matrix F.

In accordance with still another aspect of the present invention, a method of processing a received signal y comprises the following: (a) decoding the received signal y to form data s; (b) forming a convolution matrix $\hat{S}$ from the data s; (c) forming a matrix F from the data s, wherein the matrix F results from forming the matrix $\hat{S}$ as a convolution matrix; and, (d) performing a conjugate gradient algorithm based on the received signal y, the matrix $\hat{S}$, and the matrix F, wherein the conjugate gradient algorithm includes forming FFTs based on the received signal y, the matrix $\hat{S}$, and the matrix F, multiplying the FFTs to form a multiplication product, and forming an inverse FFT of the multiplication product.

In accordance with yet another aspect of the present invention, a method of processing a received signal y to produce a channel estimate comprises the following: (a) decoding the received signal y to form data s; (b) forming a convolution matrix $\hat{S}$ from the data s; (c) forming a matrix F from the data s, wherein the matrix F results from forming the matrix $\hat{S}$ as a convolution matrix; and, (d) performing a conjugate gradient algorithm to determine the channel estimate, wherein the conjugate gradient algorithm is based on the received signal y, the matrix $\hat{S}$, and the matrix F, and wherein the conjugate gradient algorithm includes forming FFTs based on the received signal y, the matrix $\hat{S}$, and the matrix F, multiplying the FFTs to form a multiplication product, and forming an inverse FFT of the multiplication product.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
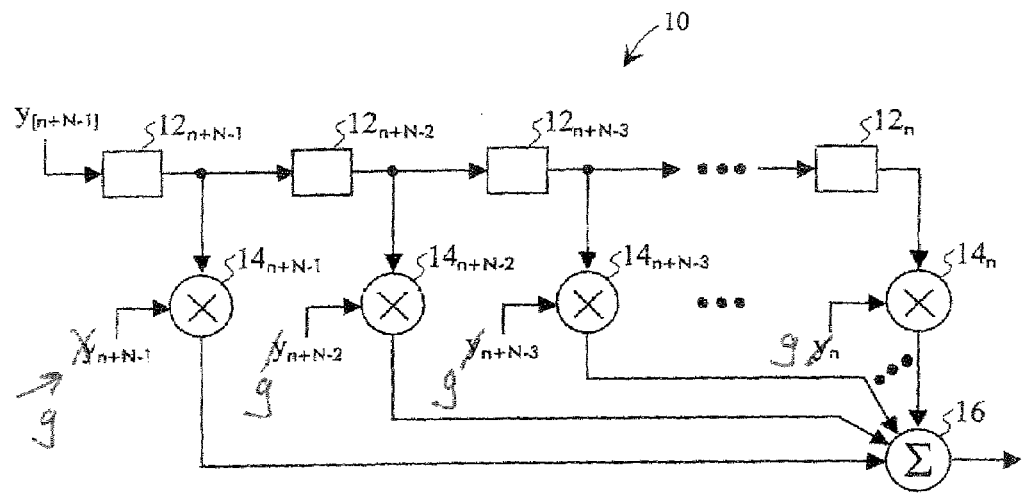
FIG. 1 illustrates a filter that can be used in a decision feedback equalizer according to an embodiment of the present invention.

As shown in FIG. 1, a filter 10 can be used as an equalizer and includes storage registers 12[n], ..., 12[n+N-3], 12[n+N-2], 12[n+N-1]. For example, N may be 512. The storage registers 12[n], ..., 12[n+N-3], 12[n+N-2], 12[n+N-1] store corresponding received data y[n], ..., y[n+N-3], y[n+N-2], y[n+N-1]. The output of each of the storage registers 12[n], ..., 12[n+N-3], 12[n+N-2], 12[n+N-1] is coupled to a corresponding multiplier 14[n], ..., 14[n+N-3], 14[n+N-2], 14[n+N-1]. Accordingly, the multipliers 14[n], ..., 14[n+N-3], 14[n+N-2], 14[n+N-1] receive the stored data from the storage registers 12[n], ..., 12[n+N-3], 12[n+N-2], 12[n+N-1]. The multipliers 14[n], ..., 14[n+N-3], 14[n+N-2], 14[n+N-1] also receive corresponding tap weights g[n], ..., g[n+N-3], g[n+N-2], g[n+N-1]. The multipliers 14[n], ..., 14[n+N-3], 14[n+N-2], 14[n+N-1] multiply each of the stored data y[n], ..., y[n+N-3], y[n+N-2], y[n+N-1] by a corresponding one of the tap weights g[n], ..., g[n+N-3], g[n+N-2], g[n+N-1], and the multiplication results are summed by a summer 16 to provide the output of the filter 10. Various algorithms as described above have been implemented in order to set the values of the tap weights g[n], ..., g[n+N-3], g[n+N-2], g[n+N-1].

Figure 2:
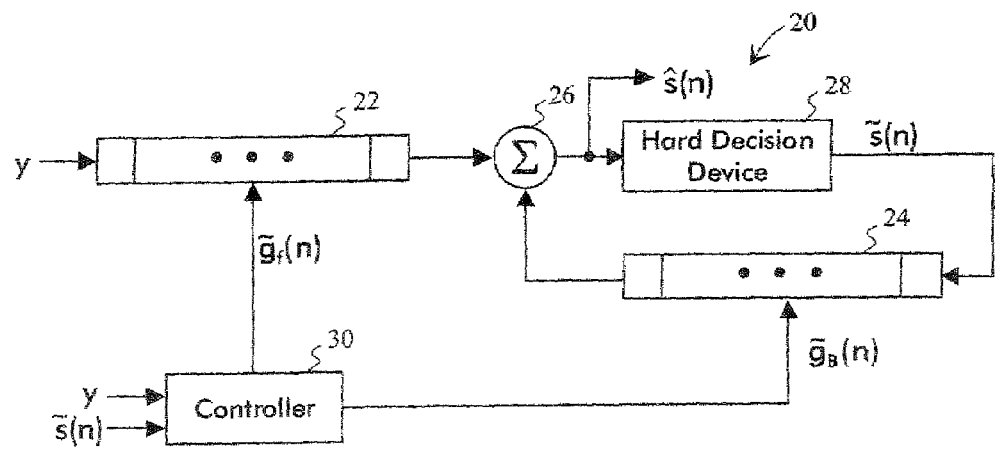
FIG. 2 illustrates the decision feedback equalizer according to an embodiment of the present invention.

A decision feedback equalizer 20 is shown in FIG. 2 and includes a feed forward filter 22, a feedback filter 24, a summer 26, a hard decision device 28, and a controller 30 that computes the tap weights for the feed forward filter 22 and the feedback filter 24. Each of the feed forward filter 22 and the feedback filter 24 may comprise the filter 10 of FIG. 1. The hard decision device 28, for example, may be a decoder or a slicer.

The output ŝ[n] of the summer 26 is the equalized output of the decision feedback equalizer 20. The hard decision device 28 (such as a slicer) determines the closest value š[n] for each of the symbols provided as the output ŝ[n] of the summer 26. These values š[n] are fed back as inputs to the feedback filter 24. The feedback filter 24 applies tap weights $\hat{g}_B[n]$ to the values š[n] and provides its output to the summer 26. Likewise, the feed forward filter 22 applies tap weights $\hat{g}_F[n]$ to the values y[n] of the received signal and provides its output to the summer 26. The summer 26 sums the output of the feedback filter 24 with the output of the feed forward filter 22 in order to produce the output ŝ[n].

The output ŝ[n] of the decision feedback equalizer 20 is given by the following equation:

$$\hat{s}[n] = \text{Re}\{g_F^h y[n]\} + g_B^T \tilde{s}[n] \quad (1)$$
$$= g_{FR}^T y_R[n] + g_{FI}^T y_I[n] + g_B^T \tilde{s}[n]$$

where š[n] as indicated above is defined to be the symbol estimates provided by the hard decision device 28, where $g_{FR}=\text{Re}\{g_F\}$ is the real part of the tap weights $g_F$ of the feed forward filter 22, where $g_{FI}=\text{Im}\{g_F\}$ is the imaginary part of the tap weights $g_F$ of the feed forward filter 22, and where $g_B$ are the tap weights of the feedback filter 24.

The definitions given by the following equations may be assumed:

$$\tilde{y}_F[n] = [y_R^T[n] y_I^T[n]]^T \quad (2)$$

$$\tilde{y}[n] = [\tilde{y}_F^T[n] \tilde{s}^T[n]]^T \quad (3)$$

$$\tilde{g}_F[n] = [g_{FR}^T[n] g_{FI}^T[n]]^T \quad (4)$$

$$\tilde{g}[n] = [\tilde{g}_F^T[n] \tilde{g}_B^T[n]]^T \quad (5)$$

where $y_R=\text{Re}\{y_F\}$ is the real part of the received symbols $y_F$, and where $y_I=\text{Im}\{y_F\}$ is the imaginary part of the received symbols $y_F$. Then, the equalized symbols ŝ[n] provided by the decision feedback equalizer 20 are given by the following equation:

$$\hat{s}[n] = \tilde{g}_F^T \tilde{y}_F[n] + g_B^T \tilde{s}[n] \quad (6)$$
$$= \tilde{g}^T \tilde{y}[n]$$

The equalizer input y[n] and the feed forward tap weights $g_F$ are complex values, the feedback tap weights $g_B$ are real, and the output ŝ[n] of the decision feedback equalizer 20 is real. The imaginary part of the output of the feed forward filter 22, $g_{FI}$, may be ignored and, therefore, not computed.

It is desired to determine the tap weight vector $\tilde{g}[n]$ so that the error at the output of the decision feedback equalizer 20 is minimized according to the following equations:

$$\tilde{g}[n] = \underset{g}{\text{argmin}} \frac{1}{2} E\{(s[n] - \hat{s}[n])^2\} \quad (7)$$

-continued
$$F(g) = E\{(s[n] - \hat{s}[n])^2\} \quad (8)$$
$$= \sigma_s^2 - \tilde{g}^H[n] r_{s\tilde{y}} - r_{s\tilde{y}}^H \tilde{g}[n] + \tilde{g}^H[n] R_{\tilde{y}\tilde{y}} g[n]$$

where $\sigma_s^2$ is the symbol variance and is equal to the average symbol energy, $R_{\tilde{y}\tilde{y}}$ is an autocorrelation matrix, and $r_{s\tilde{y}}$ is a cross correlation vector. The autocorrelation matrix $R_{\tilde{y}\tilde{y}}$ and the cross correlation vector $r_{s\tilde{y}}$ are defined in detail hereinafter. The error function F(g) is minimized by setting its gradient to zero according to the following equation:

$$\nabla F(g) = R_{\tilde{y}\tilde{y}} \tilde{g}[n] - r_{s\tilde{y}} = 0 \quad (9)$$

This minimization leads to the following well known Weiner-Hopf equation:

$$R_{\tilde{y}\tilde{y}} \tilde{g}[n] = r_{s\tilde{y}} \quad (10)$$

Solving for the desired tap weights $\tilde{g}[n]$ leads to the following equation:

$$\tilde{g}[n] = R_{\tilde{y}\tilde{y}}^{-1} r_{s\tilde{y}} \quad (11)$$

So, in order to calculate the desired tap weight vector, the large system of equations represented by equation (11) must be solved. This solution requires the inversion of the large matrix $R_{\tilde{y}\tilde{y}}$ and, therefore, a considerable amount of computation.

One method for reducing the amount of computation involved in solving a large system of equations is the aforementioned conjugate gradient algorithm. In order to set up equation (11), estimation of the auto-correlation matrix $R_{yy}[n=0]$ and the cross correlation vector $r_{sy}[n=0]$ is required. By definition, the auto-correlation matrix $R_{yy}[n]$ is given by the following equation:

$$R_{\tilde{y}\tilde{y}}[n] = E[\tilde{y}[n] \tilde{y}^H[n]] \quad (12)$$

and the cross correlation vector $r_{sy}[n]$ is given by the following equation:

$$r_{s\tilde{y}}[n] = E[s[n] \tilde{y}[n]] \quad (13)$$

where s[n] represents the transmitted symbols, E is the expectation operator, and H denotes the Hermitian transpose.

The auto-correlation matrix $R_{\tilde{y}\tilde{y}}[n]$ and the cross correlation vector $r_{s\tilde{y}}[n]$ can be estimated using the forgetting factor method according to the following equations:

$$\hat{R}_{\tilde{y}\tilde{y}}[n] = \sum_{m=0}^{n-1} \gamma^m \tilde{y}[n-m] \tilde{y}^H[n-m] \quad (14)$$
$$= \gamma \hat{R}_{yy}[n-1] + \tilde{y}[n] \tilde{y}^H[n]$$

$$\hat{r}_{s\tilde{y}}[n] = \sum_{m=0}^{n-1} \gamma^m s[n-m] \tilde{y}^H[n-m] \quad (15)$$
$$= \gamma \hat{r}_{s\tilde{y}}[n-1] + s[n] \tilde{y}^H[n]$$

where $0<\gamma<1$ is the forgetting factor. If $\gamma$ is set to 0, the equations (14) and (15) yield the estimates of the autocorrelation matrix $\hat{R}_{\tilde{y}\tilde{y}}$ and the cross correlation vector $\hat{r}_{s\tilde{y}}$ from the most recent sample vector y.

In determining the tap weights $g_F$ for the feed forward filter 22 and $g_B$ for the feedback filter 24, the controller 30 initializes the auto-correlation matrix $R_{\tilde{y}\tilde{y}}[0]$ using equation (14) and the cross correlation vector $r_{s\tilde{y}}[0]$ using equation (15) by performing averaging over a period of time such as ½ data field or so. The controller 30 also initializes the tap weights $\tilde{g}_0[0]=0$ and initializes the decision vector s[0] to the first $N_{fb}$ of the known training symbols that are contained in the field sync portion of each data field as discussed above.

Further, the controller 30 initializes the data vector $\tilde{y}[0]$ as follows. The data vector $\tilde{y}_F[0]$ as given in equation (2) is initialized by setting the real part $y_R[n=0]=\{y_R[0], \ldots, y^R[N_{ff}-1]\}^T$ such that $y_R[0], \ldots, y_R[N_{ts}-N_{fb}-1]$ are the real part of the remaining training data (after those in $\hat{s}[0]$) and $y_R[N_{ts}-N_{fb}], \Lambda, y_R[N_{ff}-1]$ are the real part of the received data after the training sequence. This setting is repeated for $\tilde{y}_I[0]$. Then, $\tilde{y}_F[0]=[y_R^T[0]y_I^T[0]]^T$ is constructed as given in equation (2) and $\tilde{y}[0]=[\tilde{y}_F^T[0]\hat{s}^T[0]]^T$ is constructed as given in equation (3) based on the initialized vectors $\tilde{y}_F[0]$ $\tilde{y}_R[0]$, and $\tilde{y}_I[0]$ as given above. In an ATSC digital television environment, for example, the number of training symbols $N_{ts}$ may be 728, the number of feed forward taps $N_{ff}$ may be 512, and the number of feedback taps $N_{fb}$ may also be 512.

Further, the controller 30 initializes the output $\hat{s}[n]$ of the decision feedback equalizer 20 as $\hat{s}[0]=\tilde{g}_0^T[0]\tilde{y}[0]$ in accordance with equation (6), the controller 30 initializes a gradient $t_n[n]$ as $t_0[0]=\hat{R}_{\tilde{y}\tilde{y}}[0]\tilde{g}_0[0]-\hat{r}_{s\tilde{y}}[0]$, and the controller 30 sets the variable n to 0.

The controller 30 then executes a conjugate gradient algorithm once for each received data element, where each iteration of the algorithm is initiated upon the shifting of a new received data element into the feed forward filter 22. The parameters of the conjugate gradient algorithm as described above are defined in the table.

TABLE

| Parameter Name | Equalizer Notation |
| --- | --- |
| Object Function Argument (Equalizer) | $g_k[n]$ |
| Argument Step Size | $\alpha_k[n]$ |
| Gradient | $t_k[n]$ |
| Conjugate Directions | $b_k[n]$ |
| Conjugate Direction Step Size | $\beta_k[n]$ |

This conjugate gradient algorithm is as follows:
1. calculate conjugate direction $b_k[n]$
   if n modulo($N_{taps}$)=0
   $b_0[n]=-t_0[0]$ (reset)
   else $$\beta_0[n] = \frac{(t_o[n]-t_{-1}[n])^H t_0[n]}{(t_0[n]-t_{-1}[n])^H b_{-1}[n]}$$

$$b_0[n] = -t_0[n] + \beta_0[n]b_{-1}[n]$$

2. calculate argument step size $\alpha_k[n]$ $$\alpha_0[n] = \frac{-b_0^H[n]t_0[n]}{b_0^H[n]\hat{R}_{\tilde{y}\tilde{y}}[n]b_0[n]}$$

3. tap update
   $\tilde{g}_1[n]=\tilde{g}_0[n]+\alpha_0[n]b_0[n]$
4. n=n+1
   $\tilde{g}_0(n)=\tilde{g}_1[n-1]$
   $t_{-1}[n]=t_0[n-1]$
   $b_{-1}[n]=b_0[n-1]$
5. update input vector $\tilde{y}[n]$ with the next received data element and update $\hat{R}_{\tilde{y}\tilde{y}}[n]$ per equation (14)
6. Calculate output of the decision feedback equalizer 20
   $\hat{s}[n]=\tilde{g}_0^T[n]\tilde{y}[n]$
7. calculate gradient $t_k[n]$
   $t_0[n]=t_{-1}[n]+\alpha_0[n][\hat{R}_{\tilde{y}\tilde{y}}[n]b_0[n]]$
8. Return to step 1

The largest of the part of the computations required by this conjugate gradient algorithm is contributed by the matrix-vector multiplications $\hat{R}_{\tilde{y}\tilde{y}}[n]b_0[n]$ of steps 2 and 7. These multiplications require the update of matrix $\hat{R}_{\tilde{y}\tilde{y}}[n]$ from the vector $\tilde{y}[n]$ as in equation (14). This update requires one multiply for each of the $N_{taps}^2$ matrix elements, a total of $N_{taps}^2$ multiplies. Then, the matrix-vector multiplication requires an additional $N_{taps}^2$ multiplies. Accordingly, the total computation is $N_{taps}^2 + N_{taps}^2 = 2N_{taps}^2$ multiplies.

This computational load can be decreased as explained below.

A matrix-vector multiplication given by a=Yb, where Y is a convolution matrix, b is a vector, and a is the multiplication result, is equivalent to a[n]=y[n]*b[n] where * denotes linear convolution. These equations may be represented in matrix form by the following equation:

$$\begin{bmatrix} a[0] \\ a[1] \\ a[2] \end{bmatrix} = \begin{bmatrix} y[0] & y[-1] & y[-2] \\ y[1] & y[0] & y[-1] \\ y[2] & y[1] & y[0] \end{bmatrix} \begin{bmatrix} b[0] \\ b[1] \\ b[2] \end{bmatrix} \quad (16)$$

where n is chosen as a small number for explanatory purposes only. The columns and rows of the matrix Y in equation (16) can be circularly extended in accordance with the following equation:

$$\begin{bmatrix} a[0] \\ a[1] \\ a[2] \\ dc \\ dc \end{bmatrix} = \begin{bmatrix} y[0] & y[-1] & y[-2] & y[2] & y[1] \\ y[1] & y[0] & y[-1] & y[-2] & y[2] \\ y[2] & y[1] & y[0] & y[-1] & y[-2] \\ y[-2] & y[2] & y[1] & y[0] & y[-1] \\ y[-1] & y[-2] & y[2] & y[1] & y[0] \end{bmatrix} \begin{bmatrix} b[0] \\ b[1] \\ b[2] \\ 0 \\ 0 \end{bmatrix} \quad (17)$$

where dc means don't care. Equation (17) is equivalent to $a[n]=y[n]\circledast b[n]$ where $\circledast$ denotes circular convolution. Circular convolution is equivalent to the following operation:

$$Y=FFT(y) \quad (18)$$

$$B=FFT(b) \quad (19)$$

$$A=Y \times B \quad (20)$$

$$a=IFFT(A) \quad (21)$$

where FFT in equations (18) and (19) indicates the Fast Fourier Transform operation, IFFT in equation (21) indicates the Inverse Fast Fourier Transform operation, and × in equation (20) indicates point-wise vector multiplication such that the elements of the resultant vector are given by $Y_0 \times B_0$, $Y_1 \times B_1$, $Y_2 \times B_2$, etc.

An embellishment on the above process involves 0 padding the columns to lengths of $2^n$. This 0 padding, as is well known, permits a computationally efficient FFT. Accordingly, the matrix-vector multiplication a=Yb can be written with 0 padding in matrix form according to the following equation:

$$\begin{bmatrix} a[0] \\ a[1] \\ a[2] \\ dc \\ dc \\ dc \\ dc \\ dc \end{bmatrix} = \begin{bmatrix} y[0] & y[-1] & y[-2] & 0 & 0 & 0 & y[2] & y[1] \\ y[1] & y[0] & y[-1] & y[-2] & 0 & 0 & 0 & y[2] \\ y[2] & y[1] & y[0] & y[-1] & y[-2] & 0 & 0 & 0 \\ 0 & y[2] & y[1] & y[0] & y[-1] & y[-2] & 0 & 0 \\ 0 & 0 & y[2] & y[1] & y[0] & y[-1] & y[-2] & 0 \\ 0 & 0 & 0 & y[2] & y[1] & y[0] & y[-1] & y[-2] \\ y[-2] & 0 & 0 & 0 & y[2] & y[1] & y[0] & y[-1] \\ y[-1] & y[-2] & 0 & 0 & 0 & y[2] & y[1] & y[0] \end{bmatrix} \begin{bmatrix} b[0] \\ b[1] \\ b[2] \\ 0 \\ 0 \\ 0 \\ 0 \\ 0 \end{bmatrix} \quad (22)$$

It is noted that matrix Y has a Toeplitz structure, and that $Y^H$ is also a Toeplitz matrix. (H denotes Hermitian transpose.)

It will be shown that the need for both the $R_{\tilde{y}\tilde{y}}$ update and the $R_{\tilde{y}\tilde{y}}b$ multiply can be eliminated, and that the matrix $R_{\tilde{y}}$ $\tilde{y}$ need not even be created.

Let Y=0 for equation (14). It is well known that $$R_{\tilde{y}\tilde{y}} = \tilde{y}\tilde{y}^H YY^H$$

where Y is a convolution matrix based on the vector y (that is, y forms the first column of the matrix Y). The vector $\tilde{y}$ may be 0 padded to length $2^n$. Let $\tilde{y}'$ be the first column of $Y^H$. For the conjugate gradient operation, the calculation given by the following equation must be made:

$$v = \hat{R}_{\tilde{y}\tilde{y}}[n]b_0[n] = Y^H Y b_0[n] \quad (23)$$

In order to calculate v, the quantity $Y'b_0[n]$ should first be calculated according to the following equations:

$$Y = FFT(y) \quad (24)$$

$$B = FFT(b) \quad (25)$$

$$X = Y \times B \quad (26)$$

$$x = IDFT(X) \quad (27)$$

$x_N$=first N elements of x, remaining elements=0 (28)

$$X_N = FFT(x_N) \quad (29)$$

where × in equation (26) denotes point-wise vector multiplication. Then, $Y \times X_N$ is calculated according to the following equations:

$$Y' = FFT(y') \quad (30)$$

$$V = Y' \times X \quad (31)$$

$$v = IDFTV \quad (32)$$

$v_N$=first N elements of v, remaining elements=0 (33)

The number of multiplies in this process, particularly for large $N_{taps}$, is much less that $2N_{taps}^2$.

In the process given by equations (24)-(33), b is the vector $b_0$ of the eight step algorithm described above, y is a vector of received symbols as described above, and $v_N$ is the quantity $\hat{R}_{\tilde{y}\tilde{y}}[n]b_0[n]$ in steps 2 and 7 of the conjugate gradient algorithm described above.

The conjugate gradient algorithm described above can be used to make other calculations. For example, the conjugate gradient algorithm described above can be used to calculate updated channel impulse response estimates. This calculation can be useful, for instance, because known alternative methods of calculating MMSE (Minimum Mean Square Error) equalizer tap weights are based on having a channel impulse response estimate.

The conjugate gradient method described above permits the continuous calculation of channel impulse response estimate updates between training sequences (when only a priori unknown symbols are received) in a receiver for a time varying multipath channel. This calculation utilizes a least squares channel impulse response estimation calculated from an over-determined system of equations. Dynamic changes to the channel impulse response may be tracked by using receiver trellis decoder decisions on input symbols to form a long sequence of almost perfectly known symbols. This sequence should have relatively few errors.

The channel impulse response to be estimated is of length $L_h = L_{ha} + L_{hc} + 1$ where $L_{ha}$ is the length of the anti-causal part of the channel impulse response and $L_{hc}$ is the length of the causal part of the channel impulse response.

The reliable trellis decoder decisions on the input symbols is a vector designated herein as s of length $L_s$. A Toeplitz matrix S may be defined based on this vector s according to the following equation:

$$S = \begin{bmatrix} S_{Lh-1} & S_{Lh-2} & - & - & - & - & S_0 \\ - & S_{Lh-1} & - & - & - & - & - \\ - & - & & & & & - \\ - & - & & & & & - \\ - & - & & & & & S_{Lh-1} \\ - & - & & & & & - \\ - & - & & & & S_{Ls-Lh} & - \\ S_{Ls-1} & S_{Ls-2} & - & - & - & - & S_{Ls-Lh} \end{bmatrix} \quad (34)$$

where the elements in the matrix of equation (34) are real and consist of the symbol decisions of vector s.

To ensure an over-determined system of equations, the following inequality is necessary:

$$L_S \geq 2L_h - 1. \quad (35)$$

The matrix S is of dimension $(L_S-L_h+1) \times L_h$ with $(L_S-L_h+1) \geq L_h$. The received signal vector is y with data elements $y_i$ for $L_{hc} \leq i \leq (L_S-L_{ha}-1)$ where $y_i$ is the received symbol corresponding to input symbol decision $s_i$. Then, y=Sh+u where h is the $L_h$ long channel impulse response vector and u is a white noise vector.

The least squares solution for h is given by the following equation:

$$\hat{h}_{LS}=(S^TS)^{-1}S^Ty. \quad (36)$$

By utilizing reliable trellis decoder input symbol decisions, there should be sufficient support for calculating a channel impulse response estimate of the required length. As required by inequality (35), the vector s of symbol decisions must be at least twice as long as the channel impulse response being estimated.

For an 8 VSB receiver application, the following parameters may be assumed: $L_h=512$, $L_{ha}=63$, $L_{hc}=448$, and $L_S=2496$. The vector s may be formed from a sequence of trellis decoder decisions on the input symbols. Normally, the trellis decoder would just make output bit pair decisions, but it can also make equally reliable decisions on the input symbols.

The vector s, for example, may be selected as 3 segments ($L_S=2496$ symbols) long. So, three data segments may be used to produce a single channel impulse response estimate update. A new channel impulse response estimate update can be obtained once per segment by proceeding in a sliding window manner. Optionally, several consecutive channel impulse response estimate updates can be averaged in order to further improve channel impulse response estimate accuracy if necessary. Of course, this additional step of averaging can be a problem if the channel impulse response is varying rapidly.

A vector b with fewer than 3 segments of symbol decisions may be used, but as stated in inequality (35), the length of vector b must be at least twice as long as the channel impulse response to be estimated. Longer b vectors help to diminish the adverse effect of additive white Gaussian noise on the channel.

The system of equations represented by equation (36) may be solved using the conjugate gradient algorithm in a manner similar to that previously described to solve equation (11) for the MMSE tap weights where $S^Ty$ in equation (36) takes the place of $r_{s\tilde{y}}$ in equation (11), where $S^TS$ in equation (36) takes the place of $R_{\tilde{y}\tilde{y}}$ in equation (11), and where $\hat{h}_{LS}$ in equation (36) takes the place of $\tilde{g}$ in equation (11).

So, the conjugate gradient algorithm described above can facilitate the computation of $(S^TS)b$ for the case of the channel impulse response estimation just as it facilitated the computation of $R_{\tilde{y}\tilde{y}}b$ for the calculation of tap weights.

In further reducing the computation complexity necessary to implement the matrix-vector multiplications required to perform the conjugate gradient algorithm, such as when the conjugate gradient algorithm is used to estimate a channel as described above, it is useful to note that the conjugate gradient algorithm may be used to solve the following linear system for the channel estimate h:

$$Sh=y. \quad (37)$$

The matrix S is an m×n (e.g., 1985×512) Toeplitz matrix derived from symbol decisions, and y is a vector (the observation vector) derived from the received data. The symbol decisions can be made, for example, by a trellis decoder or a slicer.

The system may be written as $S^TSh=S^Ty$ by multiplying both sides of equation (37) by $S^T$. The conjugate gradient algorithm can be used to solve this system for the channel estimate h according to the following steps:

(1) Calculate the residual vector $r_1$ representing the system $S^Ty-S^TSh_1$ as follows:

$$r_1=S^Ty-S^TSh_1 \quad (38)$$

where $r_1$ is a 512×1 vector, and where $h_1$ is the previous channel estimate which may be initialized to any desired value such as $h_1=0$.

(2) For k=1 to n, iteratively calculate the following:

(a) $d_k=r_k+\beta_k d_{k-1}$ \quad (39)

where $\beta_1=0$, $$\beta_{k \geq 2} = \frac{r_k^T \cdot r_k}{r_{k-1}^T \cdot r_{k-1}},$$

and where $d_k$ is a 512×1 vector;

(b) $h_{k+1}=h_k+\alpha_k d_k$ \quad (40)

where $h_{k+1}$ is a 512×1 vector, where $\alpha_k$ is 1×1, where $$\alpha_k = \frac{r_k^T \cdot r_k}{d_k \cdot q_k},$$

where $q_k=S^TSd_k$, where $S^T$ is a 512×1985 matrix, and where S is a 1985×512 matrix; and, (c) $r_{k+1}=r_k-\alpha_k q_k$ \quad (41)

where $r_{k+1}$ is a 512×1 vector.

Steps 2(a)-(c) are repeated enough times until a desired accuracy is achieved for the channel estimate h. The index k, for example, may be incremented up to a value of 5 although any other desired value can be used. It will be seen that step 2(b) includes the matrix vector multiplication $S^TSd_k$. This operation is computationally very complex. A technique for reducing the computational complexity of implementing this operation is suggested above with respect to equations (23)-(33). The present invention improves this technique.

Figure 3:
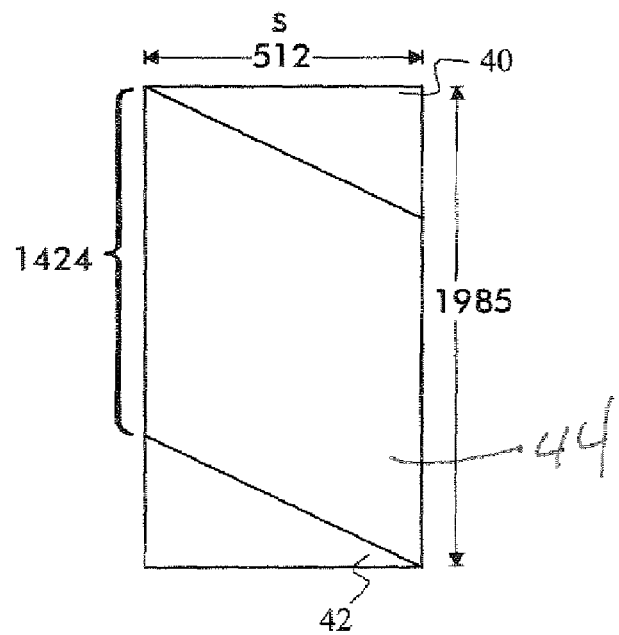
FIG. 3 illustrates a matrix S which is derived from a vector of symbol decisions of length 2496 and is useful in describing the present invention.

A straightforward approach to this technique would be to form the FFT of each of the three components $S^T$, S, and $d_k$, point-wise vector multiply the three resulting FFTs, and then take the inverse FFT of the multiplication result. This series of calculations, however, does not provide an accurate answer because the matrix S is not a true convolution matrix, and the IFFT of the triple product, therefore, produces a corrupted result. FIG. 3 illustrates the matrix S which is derived from a vector of symbol decisions of length 2496 (three segments of a VSB field). The first row of the matrix S contains symbol decision 512 in the first column down to symbol decision 1 in the last column, the second row of the matrix S contains symbol decision 513 in the first column down to symbol decision 2 in the last column, and so on. The portions of the matrix S which prevent it from being a true convolution matrix are the triangular areas 40 and 42. The diagonal lines in FIG. 3 are parallel.

Figure 4:
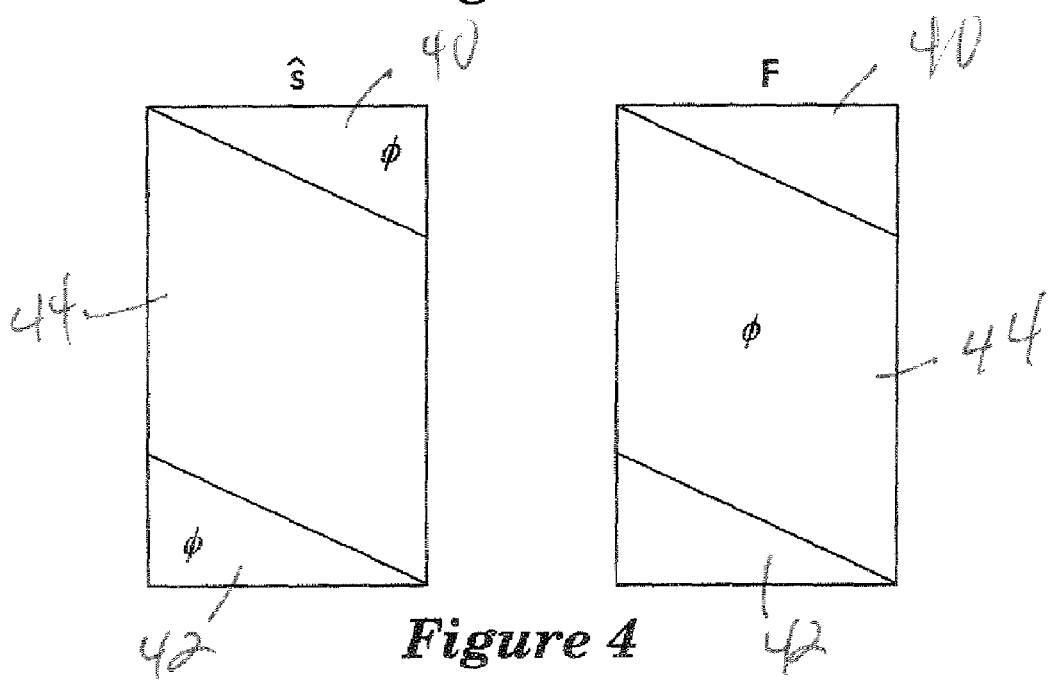
FIG. 4 illustrates the decomposition of the matrix S to form two matrices $\hat{S}$ and F useful in implementing the present invention; and, FIG. 5 shows a system for determining a channel estimate h based on the matrices $\hat{S}$ and F.

According to the present invention, and as shown in FIG. 4, matrix S of FIG. 3 is decomposed to form two matrices $\hat{S}$ and F such that the matrix $\hat{S}$ is a true convolution matrix. Accordingly, the area 44 of the matrix $\hat{S}$ is the same as the area 44 of the matrix S, and the symbol decisions in the areas 40 and 42 of the matrix $\hat{S}$ are set to zero. The symbol decisions in the area 44 of the matrix F are set to zero, and the areas 40 and 42 of the matrix F are the same as the areas 40 and 42 of the matrix S. A new linear system based on $\hat{S}$ and F is then defined which may be solved for the channel estimate h. Advantageously, FFT operations of $\hat{S}$ may be used for implementing the matrix vector multiplication of the conjugate gradient algorithm without corruption because $\hat{S}$ is a true convolution matrix.

More specifically, because the linear system is defined by y=Sh, the following equations result:

$$y = (\hat{S} + F)h \tag{42}$$

$$y = \hat{S}h + Fh \tag{43}$$

$$y - Fh = \hat{S}h \tag{44}$$

Defining $y - Fh_1 = \hat{y}$, where $h_1$ is a previous channel estimate derived by any known technique, the new system expression becomes $\hat{y} = \hat{S}h$. This expression can be written as $\hat{S}^T\hat{y} = \hat{S}^T\hat{S}h$. The conjugate gradient algorithm can then be applied to solve for h in the new system as follows:

(1) $\hat{y} = y - Fh_1$,
    $r_1 = \hat{S}^T\hat{y} - \hat{S}^T\hat{S}h_1$
(2) For k=1 to n, iteratively calculate $$d_k = r_k + \beta_k d_{k-1} \tag{a}$$

$$h_{k+1} = h_k + \alpha_k d_k \tag{b}$$

$$r_{k+1} = r_k - \alpha_k q_{k-1} \tag{c}$$

where $h_1$ may be initialized to any desired value such as 0, and where $d_0$, $r_o$, $\beta_k$, and $\alpha_k$ are as previously defined.

As indicated above following equation (40), step 2(b) includes calculating the expression $q_k = \hat{S}^T S d_k$. This multiplication may be conveniently solved by forming the FFT of (i) the matrix $\hat{S}$, (ii) $d_k$, and (iii) $\hat{S}^T$. The three FFT results are then point-wise vector multiplied, and the inverse FFT (IFFT) is taken of the multiplication result. The first N elements of this IFFT produces qk. N, for example, can have a value of 512 for a 1024 point FFT/IFFT. However, N can have other values as desired.

Figure 5:
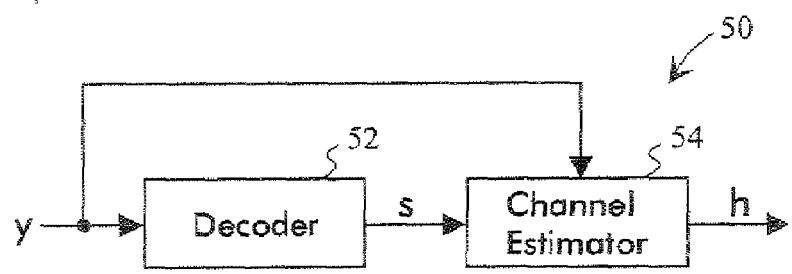

FIG. 5 shows a system 50 for implementing this technique so as to determine a channel estimate h. The system 50 includes a decoder 52 that decodes the received data y to produce the symbols s. As described above, the decoder 52 may be a trellis decoder. However, the decoder 52 may be other forms of decoders such as slicers. A channel estimator 54 produces a channel estimate h using the techniques described above.

Modifications of the present invention will occur to those practicing in the art of the present invention. For example, the Fast Fourier Transform (FFT) and Inverse Fast Fourier Transform (IFFT) are used in the present invention as described above. Alternatively, the Discrete Fourier Transform (DFT) and Inverse Discrete Fourier Transform (IDFT) can be used instead of the FFT and IFFT.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of processing a received signal y to produce a channel estimate comprising:
   (a) decoding the received signal y to form data s;
   (b) forming a convolution matrix $\hat{S}$ from the data s;
   (c) forming a matrix F from the data s, wherein the matrix F results from forming the matrix $\hat{S}$ as a convolution matrix; and,
   (d) performing a conjugate gradient algorithm to determine the channel estimate, wherein the conjugate gradient algorithm is based on the received signal y, the matrix $\hat{S}$, and the matrix F.

2. The method of claim 1 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$, is determined by forming a first FFT of the matrix $\hat{S}$, by forming a second FFT of the matrix $\hat{S}^T$, by forming a third FFT of $d_k$, by multiplying the first, second, and third FFTs to produce a multiplication result, and by forming an inverse FFT of the multiplication result.

3. The method of claim 1 wherein the forming of a matrix $\hat{S}$ from the data s comprises:
   forming a matrix S from the data s; and,
   forming the matrix $\hat{S}$ from the matrix S by setting certain values of the matrix S to zero;
   and wherein the forming of a matrix F from the data s comprises:
   forming the matrix F from the matrix S by setting to zero the values of the matrix S not set to zero during the forming of the matrix $\hat{S}$.

4. The method of claim 3 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

5. The method of claim 1 wherein the performing of a conjugate gradient algorithm to determine the channel estimate h comprises performing the following algorithm:

(1) $\hat{y} = y - Fh_2$, $r_1 = \hat{S}^T\hat{y} - \hat{S}^T\hat{S}h_1$ (2) For k=1 to n, iteratively calculate (a) $d_k = r_k + \beta_k d_{k-1}$ (b) $h_{k+1} = h_k + \alpha_k d_k$ (c) $r_{k+1} = r_k - \alpha_k q_{k-1}$ where $h_1$ is an initial value of the channel estimate, where $$\beta_1 = 0, \beta_{k \geq 2} = \frac{r_k^T \cdot r_k}{r_{k-1}^T \cdot r_{k-1}}, \text{ where } \alpha_k = \frac{r_k^T \cdot r_k}{d_k \cdot q_k}, \text{ where } q_k = S^T S d_k.$$

6. The method of claim 5 wherein the performing of a conjugate gradient algorithm comprises determining the quantity $q_k$ by forming a first FFT of the matrix $\hat{S}$, by forming a second FFT of the matrix $\hat{S}^T$, by forming a third FFT of $d_k$, by multiplying the first, second, and third FFTs to produce a multiplication result, and by forming an inverse FFT of the multiplication result.

7. The method of claim 5 wherein the forming of a matrix $\hat{S}$ from the data s comprises:

forming a matrix S from the data s; and, forming the matrix $\hat{S}$ from the matrix S by setting certain values of the matrix S to zero;

and wherein the forming of a matrix F from the data s comprises:

forming the matrix F from the matrix S by setting to zero the values of the matrix S not set to zero during forming of the matrix $\hat{S}$.

8. The method of claim 7 wherein the performing of a conjugate gradient algorithm comprises determining the quantity $q_k$ by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

9. A method of processing a received signal y comprising:

(a) decoding the received signal y to form data s;

(b) forming a convolution matrix $\hat{S}$ from the data s;

(c) forming a matrix F from the data s, wherein the matrix F results from forming the matrix $\hat{S}$ as a convolution matrix; and, (d) performing a conjugate gradient algorithm based on the received signal y, the matrix $\hat{S}$, and the matrix F.

10. The method of claim 9 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

11. The method of claim 9 wherein the forming of a matrix $\hat{S}$ from the data s comprises:

forming a matrix S from the data s; and, forming the matrix $\hat{S}$ from the matrix S by setting certain values of the matrix S to zero;

and wherein the forming of a matrix F from the data s comprises: forming the matrix F from the matrix S by setting to zero the values of the matrix S not set to zero during forming of the matrix $\hat{S}$.

12. The method of claim 11 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

13. A method of processing a received signal y comprising:

(a) decoding the received signal y to form data (b) forming a convolution matrix $\hat{S}$ from the data s;

(c) forming a matrix F from the data s, wherein the matrix F results from forming the matrix $\hat{S}$ as a convolution matrix; and, (d) performing a conjugate gradient algorithm based on the received signal y, the matrix $\hat{S}$, and the matrix F, wherein the conjugate gradient algorithm includes forming FFTs based on the received signal y, the matrix $\hat{S}$, and the matrix F, multiplying the FFTs to form a multiplication product, and forming an inverse FFT of the multiplication product.

14. The method of claim 13 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

15. The method of claim 13 wherein the forming of a matrix $\hat{S}$ from the data s comprises:

forming a matrix S from the data s; and, forming the matrix $\hat{S}$ from the matrix S by setting certain values of the matrix S to zero;

and wherein the forming of a matrix F from the data s comprises:

forming the matrix F from the matrix S by setting to zero the values of the matrix S not set to zero during forming of the matrix $\hat{S}$.

16. The method of claim 15 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

17. A method of processing a received signal y to produce a channel estimate comprising:

(a) decoding the received signal y to form data s;

(b) forming a convolution matrix $\hat{S}$ from the data s;

(c) forming a matrix F from the data s, wherein the matrix F results from forming the matrix $\hat{S}$ as a convolution matrix; and, (d) performing a conjugate gradient algorithm to determine the channel estimate, wherein the conjugate gradient algorithm is based on the received signal y, the matrix $\hat{S}$, and the matrix F, and wherein the conjugate gradient algorithm includes forming FFTs based on the received signal y, the matrix $\hat{S}$, and the matrix F, multiplying the FFTs to form a multiplication product, and forming an inverse FFT of the multiplication product.

18. The method of claim 17 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of $d_k$, by multiplying the first, second, and third FFTs to produce a multiplication result, and by forming an inverse FFT of the multiplication result.

19. The method of claim 17 wherein the forming of a matrix $\hat{S}$ from the data s comprises:
  forming a matrix S from the data s; and, forming the matrix $\hat{S}$ from the matrix S by setting certain values of the matrix S to zero;
  and wherein the forming of a matrix F from the data s comprises:
  forming the matrix F from the matrix S by setting to zero the values of the matrix S not set to zero during forming of the matrix $\hat{S}$.

20. The method of claim 19 wherein the performing of a conjugate gradient algorithm comprises determining a quantity $q_k$ according to the following equation:

$$q_k = \hat{S}^T \hat{S} d_k,$$

wherein $d_k$ is dependent upon the received signal y, the matrix $\hat{S}$, and the matrix F, and wherein $q_k$ is determined by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

21. The method of claim 17 wherein the performing of a conjugate gradient algorithm to determine the channel estimate h comprises performing the following algorithm:

(1) $\hat{y} = y - F h_1$, $r_1 = \hat{S}^T \hat{y} - \hat{S}^T \hat{S} h_1$ (2) For k=1 to n, iteratively calculate (a) $d_k = r_k + \beta_k d_{k-1}$ (b) $h_{k+1} = h_k + \alpha_k d_k$ (c) $r_{k+1} = r_k - \alpha_k q_k$ where $h_1$ is an initial value of the channel estimate, where $$\beta_1 = 0, \beta_{k \geq 2} = \frac{r_k^T \cdot r_k}{r_{k-1}^T \cdot r_{k-1}}, \text{ where } \alpha_k = \frac{r_k^T \cdot r_k}{d_k \cdot q_k}, \text{ where } q_k = S^T S d_k.$$

22. The method of claim 21 wherein the performing of a conjugate gradient algorithm comprises determining the quantity $q_k$ by forming a first FFT of the matrix $\hat{S}$, by forming a second FFT of the matrix $\hat{S}^T$, by forming a third FFT of $d_k$, by multiplying the first, second, and third FFTs to produce a multiplication result, and by forming an inverse FFT of the multiplication result.

23. The method of claim 21 wherein the forming of a matrix $\hat{S}$ from the data s comprises:
  forming a matrix S from the data s; and,
  forming the matrix $\hat{S}$ from the matrix S by setting certain values of the matrix S to zero;
  and wherein the forming of a matrix F from the data s comprises:
  forming the matrix F from the matrix S by setting to zero the values of the matrix S not set to zero during forming of the matrix $\hat{S}$.

24. The method of claim 23 wherein the performing of a conjugate gradient algorithm comprises determining the quantity $q_k$ by forming a first FFT of the matrix $\hat{S}$, by forming a second FFT of the matrix $\hat{S}^T$, by forming a third FFT of the $d_k$, by multiplying the first, second, and third FFTs to produce a multiplication result, and by forming an inverse FFT of the multiplication result.

* * * * *